US012390779B2

(12) United States Patent
Sundine et al.

(10) Patent No.: US 12,390,779 B2
(45) Date of Patent: Aug. 19, 2025

(54) SAMPLE PAINT ADAPTER

(71) Applicant: RADIA, Plymouth, MN (US)

(72) Inventors: Erik John Sundine, Monticello, MN (US); Jeffrey David Heinrichs, Waconia, MN (US)

(73) Assignee: Radia, Plymouth, MN (US)

( * ) Notice: Subject to any disclaimer, the term of this patent is extended or adjusted under 35 U.S.C. 154(b) by 616 days.

(21) Appl. No.: 17/855,252

(22) Filed: Jun. 30, 2022

(65) Prior Publication Data

US 2023/0010840 A1 Jan. 12, 2023

Related U.S. Application Data

(60) Provisional application No. 63/218,597, filed on Jul. 6, 2021.

(51) Int. Cl.
*B01F 35/42* (2022.01)
*B01F 35/43* (2022.01)
*B01F 101/30* (2022.01)

(52) U.S. Cl.
CPC ............ *B01F 35/421* (2022.01); *B01F 35/43* (2022.01); *B01F 2101/30* (2022.01)

(58) Field of Classification Search
CPC ..... B01F 35/421; B01F 35/43; B01F 2101/30
See application file for complete search history.

(56) References Cited

U.S. PATENT DOCUMENTS

| | | | | |
|---|---|---|---|---|
| 7,959,345 B2 * | 6/2011 | Benjamin, II | B01F 35/421 | 220/628 |
| 2003/0107949 A1 * | 6/2003 | Huckby | B01F 29/10 | 366/217 |
| 2003/0142583 A1 * | 7/2003 | Santospago | B01F 35/425 | 366/209 |
| 2003/0214878 A1 * | 11/2003 | Huckby | B01F 29/32 | 366/217 |
| 2005/0088910 A1 * | 4/2005 | Greco | B01F 35/421 | 366/209 |
| 2006/0109740 A1 * | 5/2006 | Huckby | B01F 35/425 | 366/208 |
| 2007/0140049 A1 * | 6/2007 | Johnson | B01F 29/10 | 366/209 |

OTHER PUBLICATIONS

"Quart/ Liter Adapter", HERO Products Group, S2425 Manual, 1 page, Jan. 2014.
"Standard quart adapter and Pint/Half Pint adapter #6786133", Radia Products , 1 page—No Date.
Radia Products Exclusive for Home Depot, A1015S Sample Adapter Info Sheet, 1 page—No Date.

* cited by examiner

*Primary Examiner* — Marc C Howell

(57) ABSTRACT

A self-balancing adapter for use with a mixer, the adapter having a body configured to interface with the mixer as a unit, the body having a front and a back, left and right edges, a top and a bottom, and a vertical axis passing through the top and the bottom, where the front has at least a first recess configured to receive and hold a first vessel substantially within the body; and the adapter having at least one movable counterweight configured to be displaced when the first vessel is received in the first recess such that the movable weight at least partially offsets a weight of the first vessel within the body with respect to the vertical axis.

20 Claims, 18 Drawing Sheets

SAMPLE PAINT ADAPTER

CROSS-REFERENCE TO RELATED APPLICATIONS

This application claims the benefit of U.S. Provisional Patent Application No. 63/218,597, filed Jul. 6, 2022, the entire contents of which are incorporated herein by reference in its entirety.

BACKGROUND

The present invention is directed to mixing, and more particularly to self-balancing adapters for allowing the use of different sized containers, such as sample containers, in a mixer typically configured to specifically use a primary or standard size container.

It is frequently desirable to mix flowable substances such as liquids contained in various containers. For example, constituent parts of paint are commonly mixed within a given container, and sometimes samples of paint are mixed in smaller containers as compared to standard size retail liquid paint cans.

At present, a mixing apparatus typically receives a set size of container to be mixed, such as a one-U.S. gallon paint can. However, drawbacks and limitations presently exist when attempting to mix a smaller, sample size paint can in the apparatus primarily designed to receive and mix paint within a larger can. Additionally, rotationally balancing of the smaller container is challenging especially if more than one container would be mixed during a single mixing cycle. Therefore, there exists a need to allow for adapting mixing apparatuses to mix one or more containers of a different size at once while keeping the apparatus balanced during mixing.

SUMMARY

The present invention addresses limitations in the art and relates to versatile adapters for use with various mixers. Examples of mixers include vortex mixers. Disclosed adapters allow for easy-to-use, self-balancing, and flexible mixing of any number or position of one, two, three, or more smaller containers (also referred to herein as vessels) at a time within a single adapter unit. Beneficially, multiple sample paint containers can be inserted and loaded into any position of a single adapter, and the adapter can then be inserted into a receiving portion of a mixer while maintaining rotational balance and smooth mixing operation regardless of how many or which locations are loaded or unloaded.

Loading the adapter is easily accomplished by inserting one or more smaller containers into recesses of the adapter. The smaller containers can be sample size paint containers or the like. One, two, three, or more sample size paint containers can be mixed at a time using the disclosed adapter.

As each smaller container is individually inserted into the adapter, a weighted balancing feature is correspondingly displaced such that a central plane of a center of gravity of the adapter is substantially maintained by a counterweight. The weighted balancing feature can incorporate a ramp feature to permit easy and consistent loading. In this way, a single container or multiple containers are each individually and independently balanced as they are inserted, resulting in an overall balanced adapter. The balanced adapter then permits smooth, consistent mixing of any number of loaded containers held by the adapter simultaneously.

According to a first aspect of the present disclosure, a self-balancing adapter for use with a mixer is disclosed. According to the first aspect, the adapter includes a body configured to interface with the mixer as a unit, the body having a front and a back, left and right edges, a top and a bottom, and a vertical adapter axis passing through the top and the bottom. Also according to the first aspect, the front has at least a first recess configured to receive and hold a first vessel substantially within the body. The adapter also includes at least one movable counterweight configured to be displaced when the first vessel is received in the first recess such that the movable weight at least partially offsets a weight of the first vessel within the body with respect to the vertical adapter axis.

According to a second aspect of the present disclosure, a mixer is disclosed. According to the second aspect, the mixer includes a receptacle supported by a carrier yoke, where the yoke is rotatably supported by a frame. The mixer also includes a motor supported by the frame, where the motor is configured to rotate at least the yoke supporting the receptacle. The mixer also includes a self-balancing adapter configured to be received within the receptacle. According to the second aspect, the adapter includes a body configured to interface with the mixer as a unit. According to the second aspect, the body includes a front and a back, left and right edges, a top and a bottom, and a vertical adapter axis passing through the top and the bottom. Also according to the second embodiment, the front has at least a first recess configured to receive and hold a first vessel substantially within the body. The adapter also includes at least one movable counterweight configured to be displaced when the first vessel is received in the first recess such that the movable weight at least partially offsets a weight of the first vessel within the body with respect to the vertical adapter axis.

According to a third aspect of the present disclosure, a method of adapting a mixer for use with different sized vessels is disclosed. According to the third aspect, the method includes providing a self-balancing adapter for use with a mixer. According to the third aspect, the adapter includes a body configured to interface with the mixer as a unit. The body includes a front and a back, left and right edges, a top and a bottom, and a vertical adapter axis passing through the top and the bottom. Also according to the third aspect, the front has at least a first recess configured to receive and hold a first vessel substantially within the body. The adapter also includes at least one movable counterweight configured to be displaced when the first vessel is received in the first recess such that the movable weight at least partially offsets a weight of the first vessel within the body with respect to the vertical adapter axis. The method also includes receiving a vessel within the adapter, and inserting the adapter into the mixer.

These and various other features and advantages will be apparent from a reading of the following detailed description.

DETAILED DESCRIPTION

Figure 1:
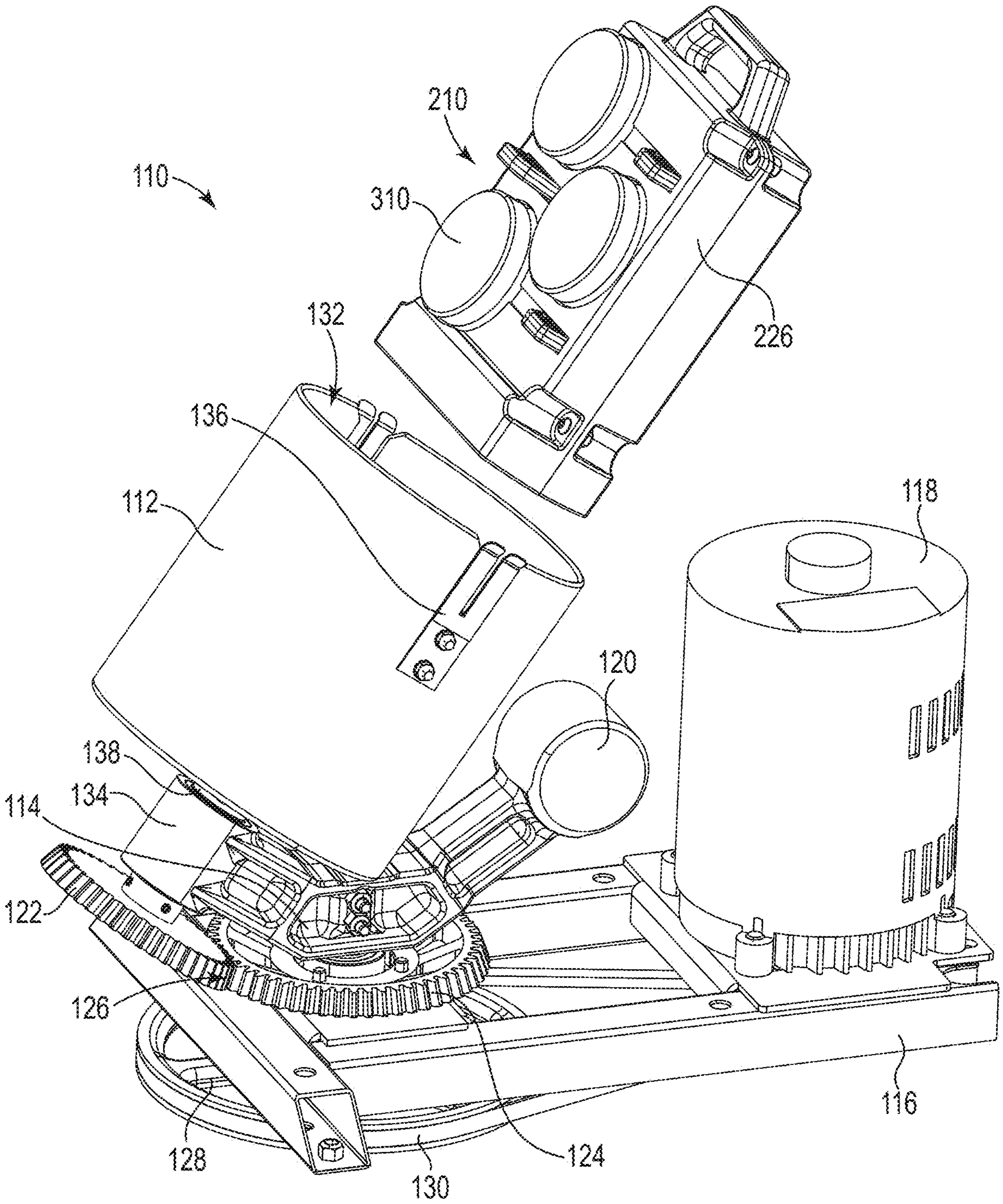
FIG. 1 is a perspective view of a mixing apparatus and an adapter for use with the mixing apparatus, according to various embodiments.
Figure 2:
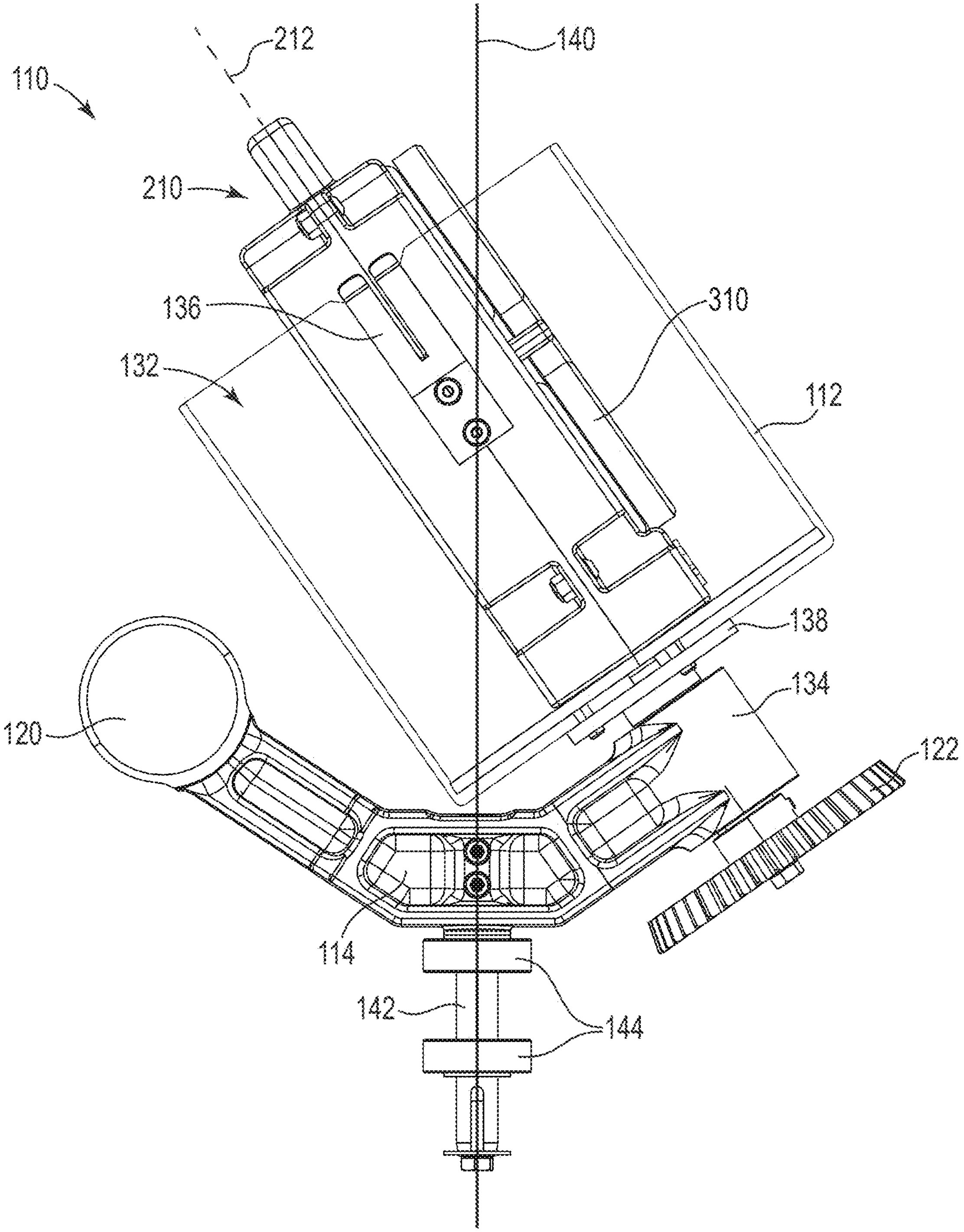
FIG. 2 is a profile view of various components of the mixing apparatus of FIG. 1, showing the adapter inserted into the mixing apparatus and a vertical mixer axis, according to various embodiments.

With reference now to the Figures, disclosed are embodiments of a self-balancing adapter for use with a mixing apparatus, such as the example mechanical, multi-axis vortex mixer 110 as shown in FIGS. 1 and 2. An example adapter 210 for use with the mixer 110 can include a body 226 with an outer shell configured to interface with an interior 132 of a receptacle 112 of the mixer 110 as a unit as shown in FIGS. 1 and 2. As shown in FIG. 1, a mixer frame 116 generally supports a motor 118 and rotatable mixing components attached to a pulley 128. A V-belt 130 then operatively connects a drive pulley (not shown) of the motor 118 to a driven pulley 128, and the driven pulley 128 in turn is connected to rotate a carrier yoke 114. Other mixer types and configurations are also contemplated.

As shown, the yoke 114 is fixedly connected to a shaft 142 that is rotatably supported by bearings 144, which are preferably supported by the frame 116 as shown in FIGS. 1 and 2. The yoke 114 includes a first end, a shaft end 134; and a second end, a counterweight end 120 located opposite the first, shaft end 134. The yoke 114 is connected to the mixer receptacle 112 that is itself caused to be rotated about a (vertical as shown) mixer axis 140 in a planetary fashion as a second gear 122 is caused to rotate about a first gear 124 that is preferably fixed and stationary and connected to frame 116. The receptacle 112 optionally has one or more bail tabs 136 configured to receive a container bail in a vertical position. The shown mixer 110 with yoke 114, shaft end 134, and a counterweight end 120 located on an opposite side of the yoke 114 are sized and weighted such that the receptacle 112 and counterweight 120 of the mixer generally have a center of gravity (COG) (which can alternatively be referred to as a center of mass) centered at mixer axis 140 (see FIG. 2). A flange 138 or other suitable interface can connect the receptacle 112 to the rotatable yoke 114, as shown.

As described herein, the mixer 110 is typically configured to receive a conventional, one U.S. gallon container, such as a standard size paint can that contains contents to be mixed. The adapter 210 as described herein can be inserted as if a standard container into the mixer 110 such that the mixer 110 is adapted seamlessly and operates normally when the adapter 210 is received and held within the receptacle 112. Therefore, in some embodiments, the adapter body 226 is shaped and sized in order to closely fit within the interior 132 of the receptacle 112. The receptacle 112 can be configured to receive a container larger than a smaller vessel 310. The vessel 310 is preferably a smaller, sample paint container for mixing within the mixer 110.

Figure 3:
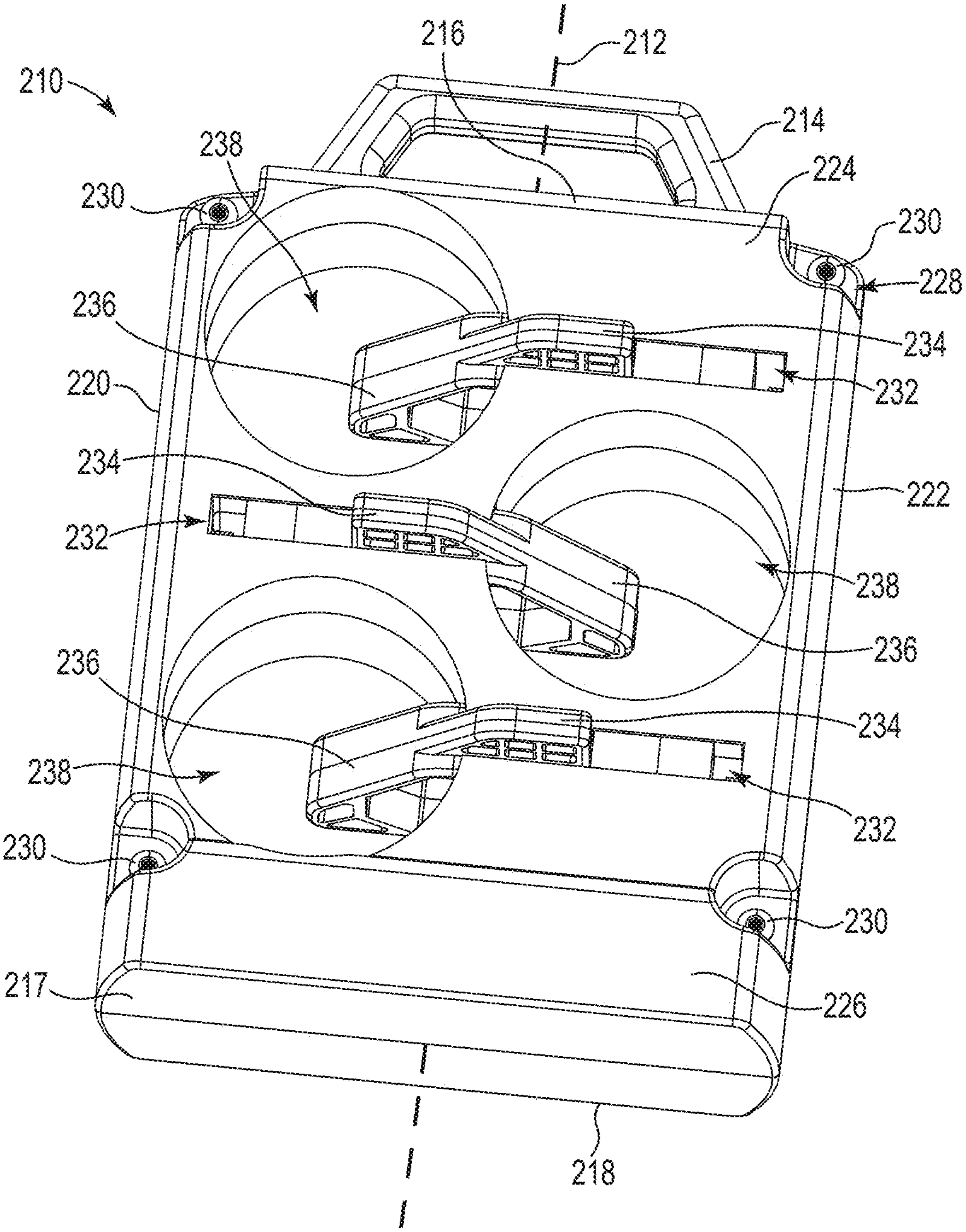
FIG. 3 is a perspective view of the adapter as shown in FIGS. 1 and 2, according to various embodiments.
Figure 4:
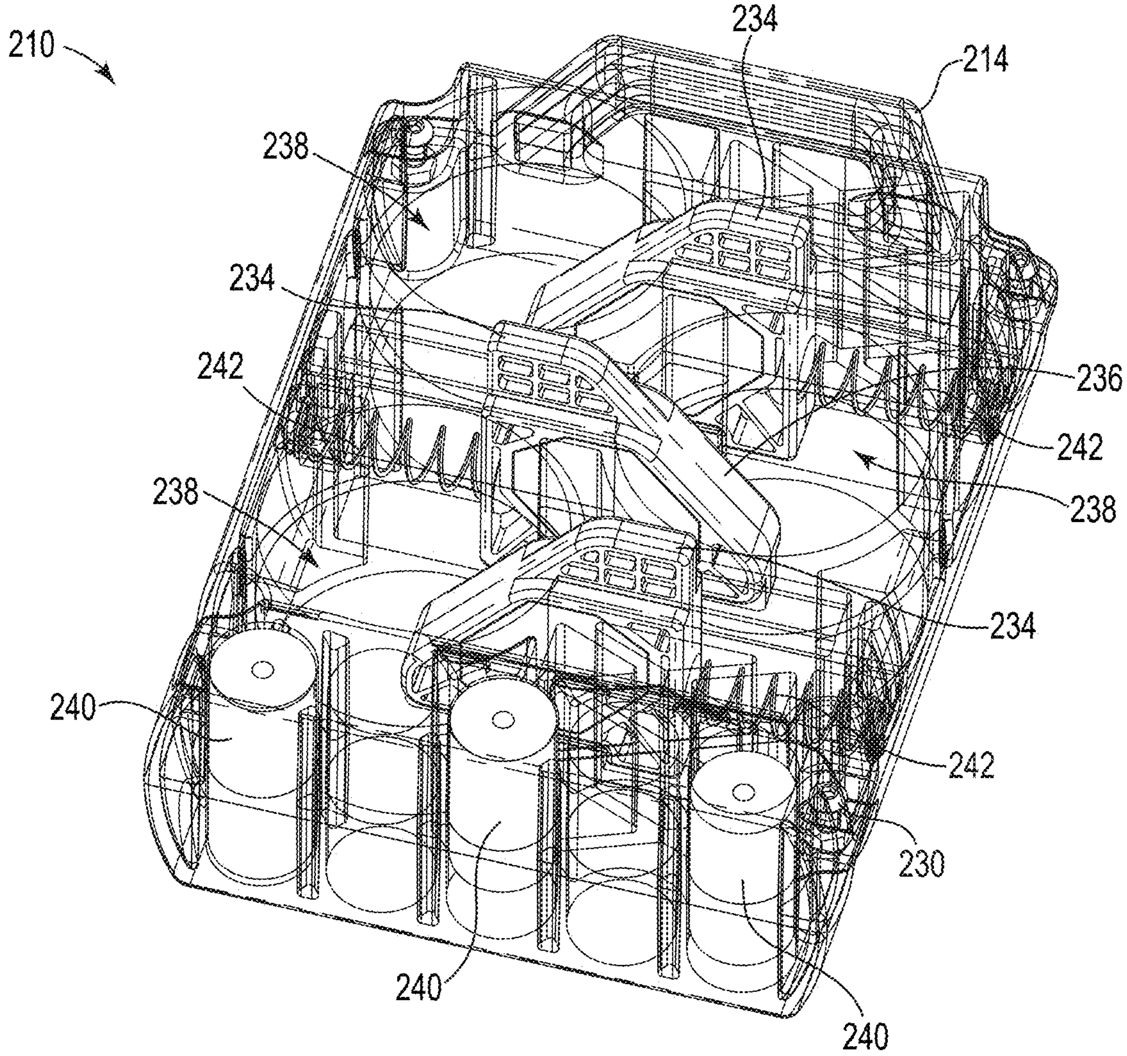
FIG. 4 is a partially transparent perspective view of the adapter of FIG. 3, according to various embodiments.

With reference now to FIGS. 3 and 4, adapter 210 is shown in greater detail. The adapter 210 is preferably an internally self-balancing adapter that includes one or more internal movable, self-balancing features that make the adapter 210 versatile and simple to use. The adapter 210, as shown, has a body 226 that includes a front 224 and a back 218, left 220 and right 222 edges, a top 216 and a bottom 217. In various embodiments, the adapter 210 body 226 is formed as a clamshell with the front 224 and the back 218 comprising separate pieces fastened together as a single housing. The front 224 and the back 218 of the body 226 can be fastened together, e.g., using fasteners 228 in corner fastener recesses 230. In some embodiments, the body 226 further comprises a handle 214 extending from the top 216 of the body 226. The handle 214 is preferably graspable by a user such that the adapter 210 can be inserted and/or removed from the receptacle 112 before or after mixing. The front 224 of the adapter 210 preferably has at least a (e.g., first) recess 238 configured to receive and hold a first container, vessel, or can (e.g., vessel 310, see FIG. 6) substantially within the body 226 of the adapter 210. For example, if a vessel 310 is intended to be loaded into the recess 238, and the vessel has a generally cylindrical shape, the recess 238 can have a corresponding and slightly larger diameter bore and cylindrical shape configured to slidably receive and closely hold and support a loaded vessel 310.

Figure 6:
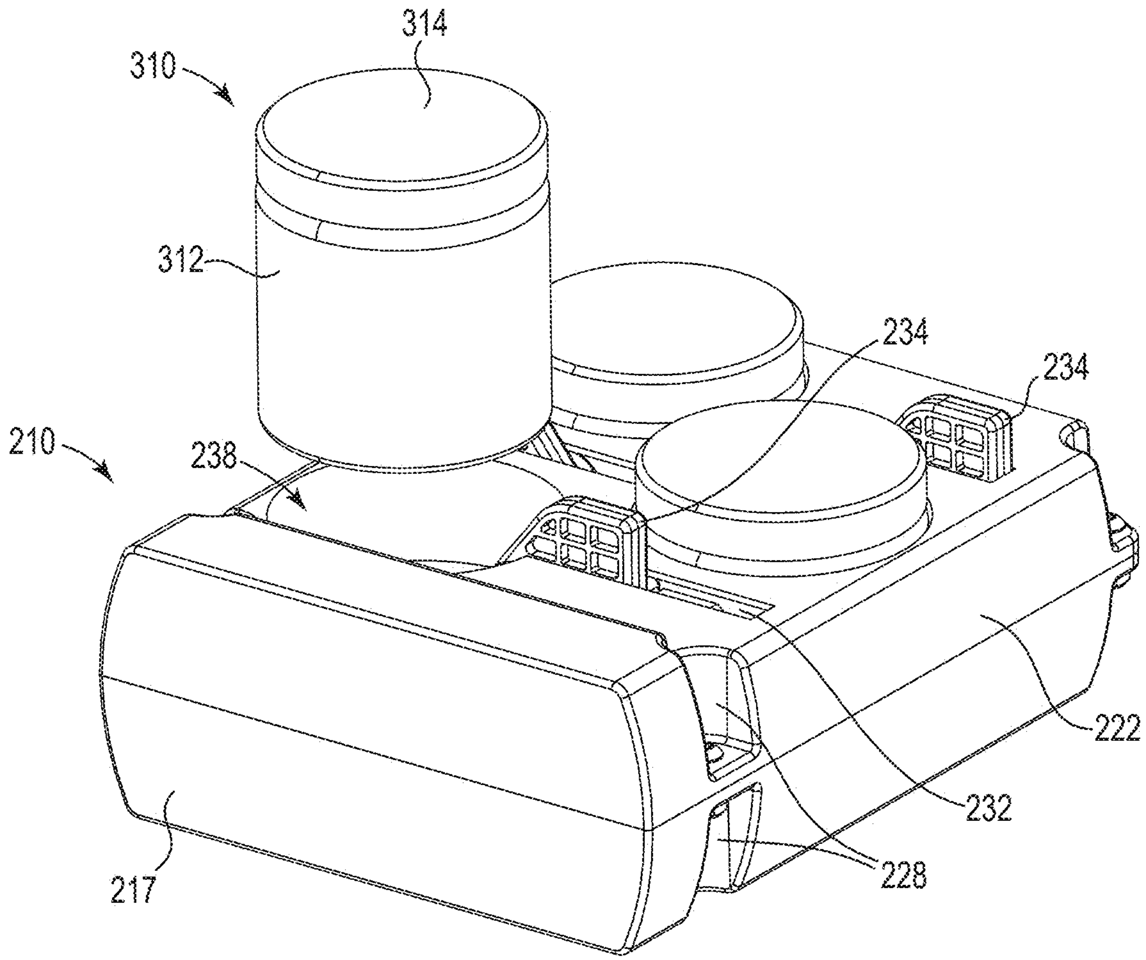
FIG. 6 is a three-quarters perspective view of the adapter of FIG. 3, showing the loading of multiple vessels into the adapter, according to various embodiments.
Figure 7:
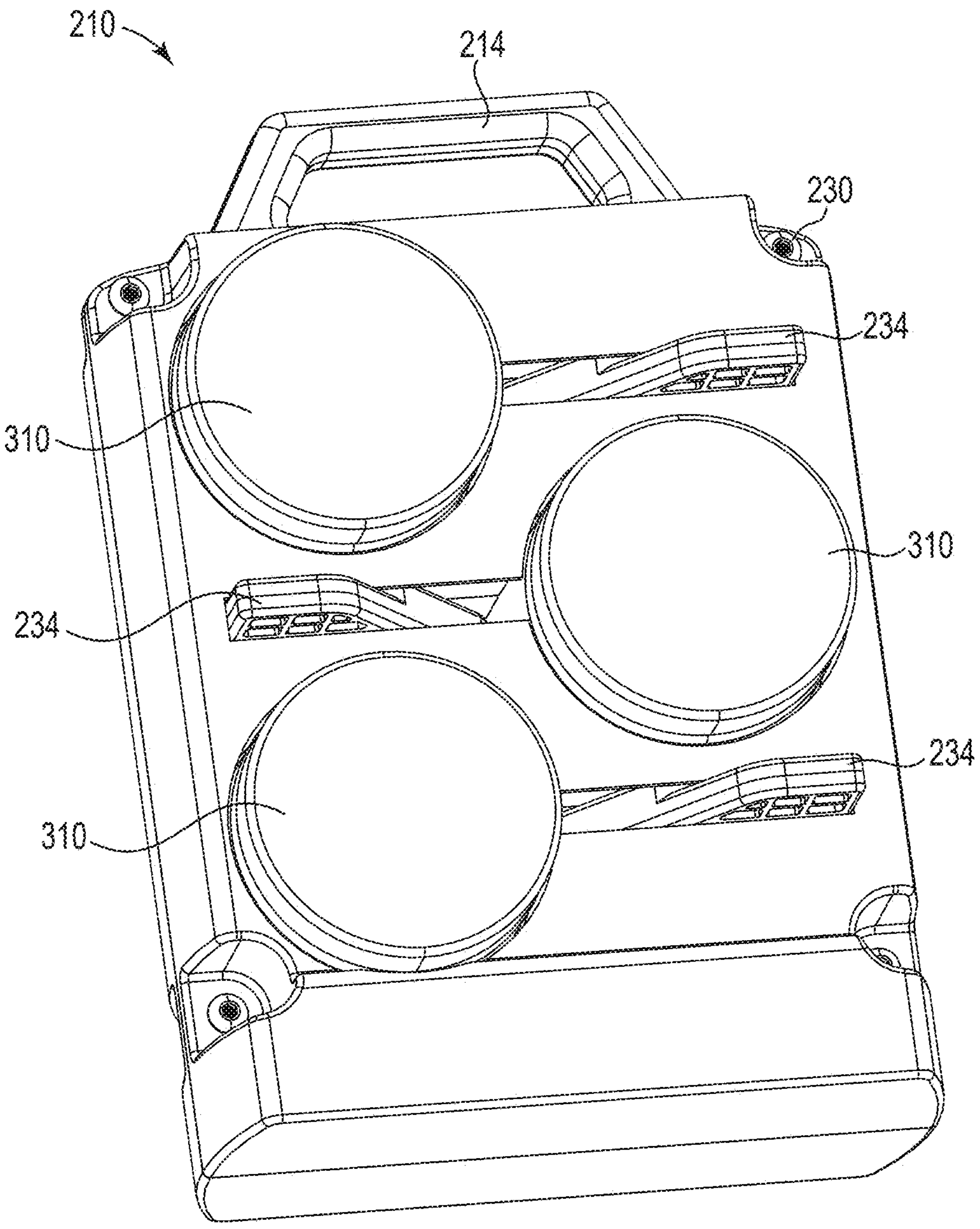
FIG. 7 is another perspective view of the adapter of FIG. 3, showing multiple vessels fully loaded into the adapter, according to various embodiments.

Other embodiments can provide for a generally rectangular recess 238 for a corresponding rectangular vessel 310 (not shown). Other shapes of the recess 238 and vessel 310 are also contemplated herein. As shown in FIG. 6, the example vessel 310 can include a lower portion 312 and a cap 314 that is optionally threadably or otherwise sealingly engageable with the lower portion 312.

As shown in FIG. 6, when each vessel 310 is loaded into the adapter 310, the vessel lower portion 312 can be substantially surrounded by the recess 238, and the cap 314 can be exposed beyond the recess, e.g., to be engageable and graspable by a user's hand for loading and unloading of one or more vessels 310. In some embodiments, the bottom 217 of the body 226 comprises an anti-skid feature (not shown) to reduce movement of the body within the mixer 110 during mixing.

Figure 9:
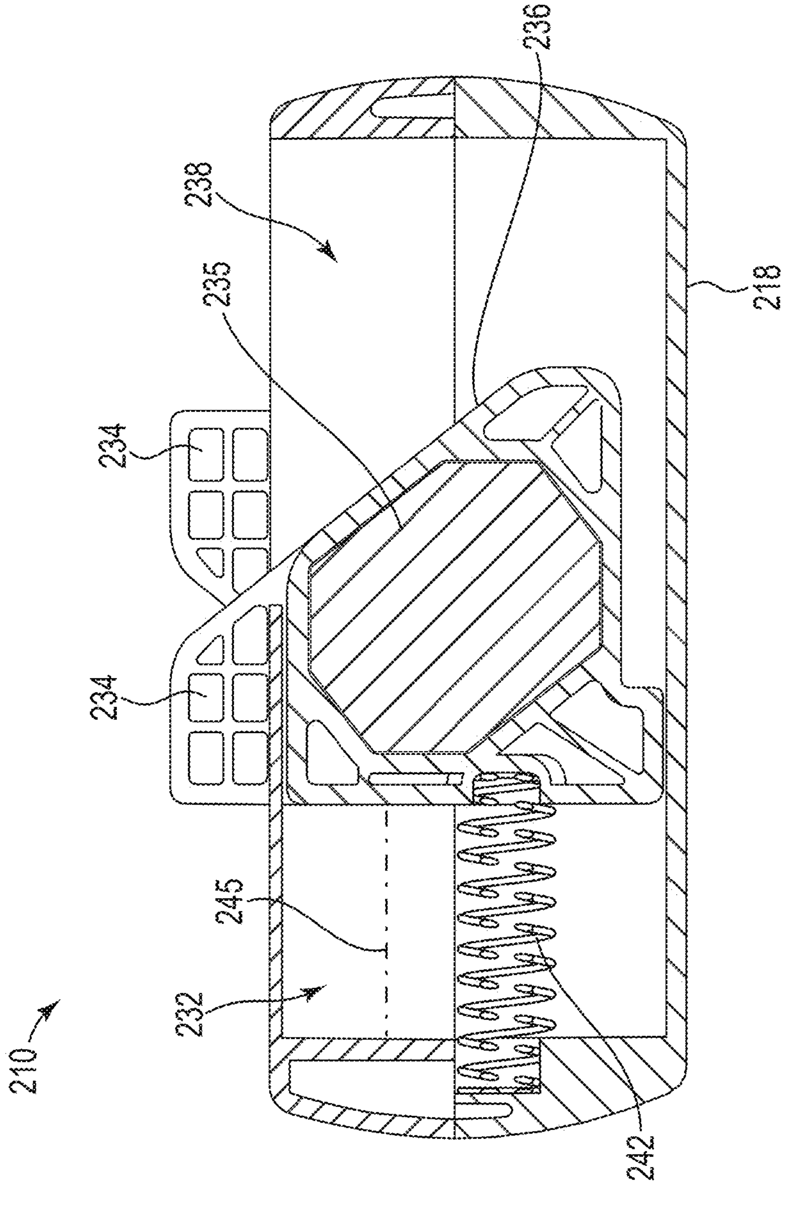
FIG. 9 is a lower cross-sectional view of the adapter of FIG. 3 showing an unloaded adapter, according to various embodiments.
Figure 10:
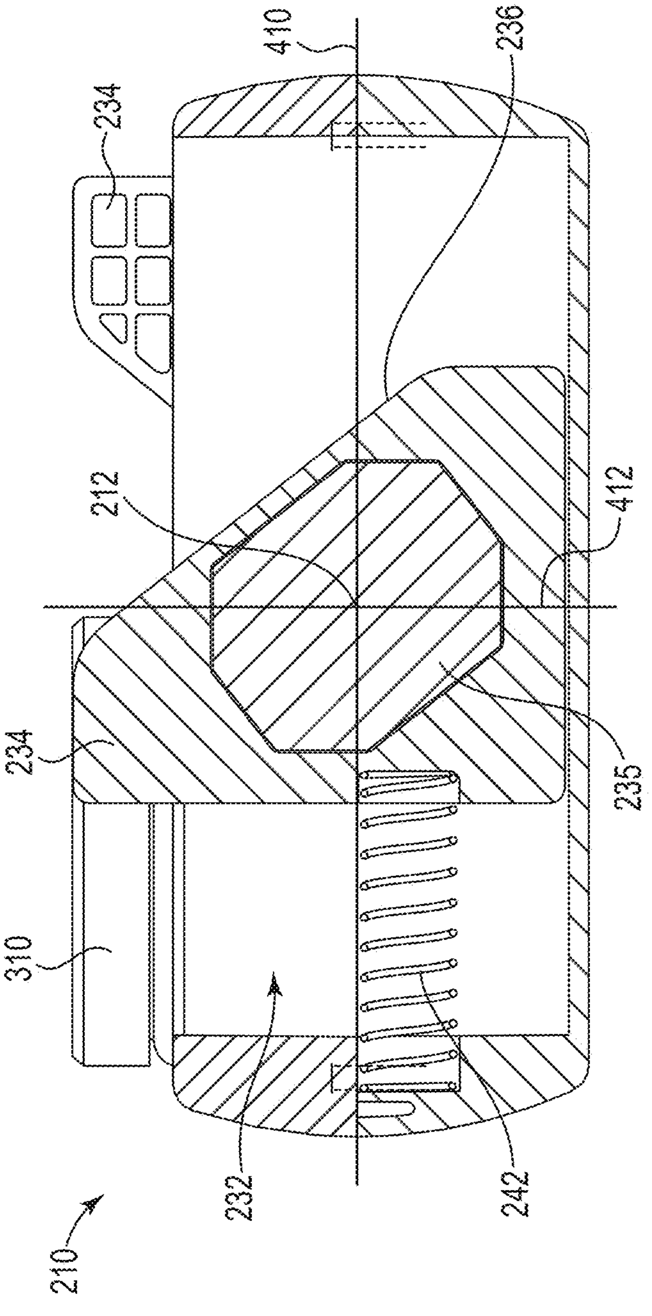
FIG. 10 is a lower cross-sectional view of the adapter of FIG. 3 showing a partially loaded adapter, according to various embodiments.
Figure 11:
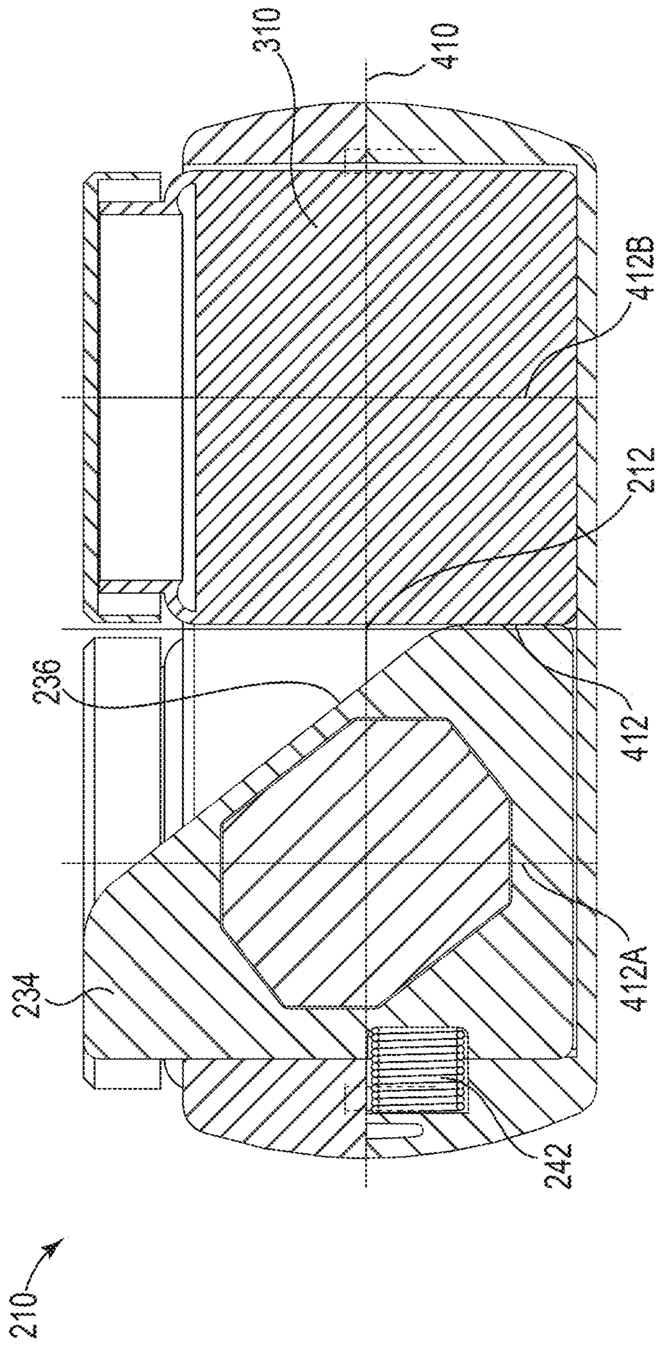
FIG. 11 is another lower cross-sectional view of the adapter of FIG. 3 showing a loaded adapter, according to various embodiments.
Figure 13:
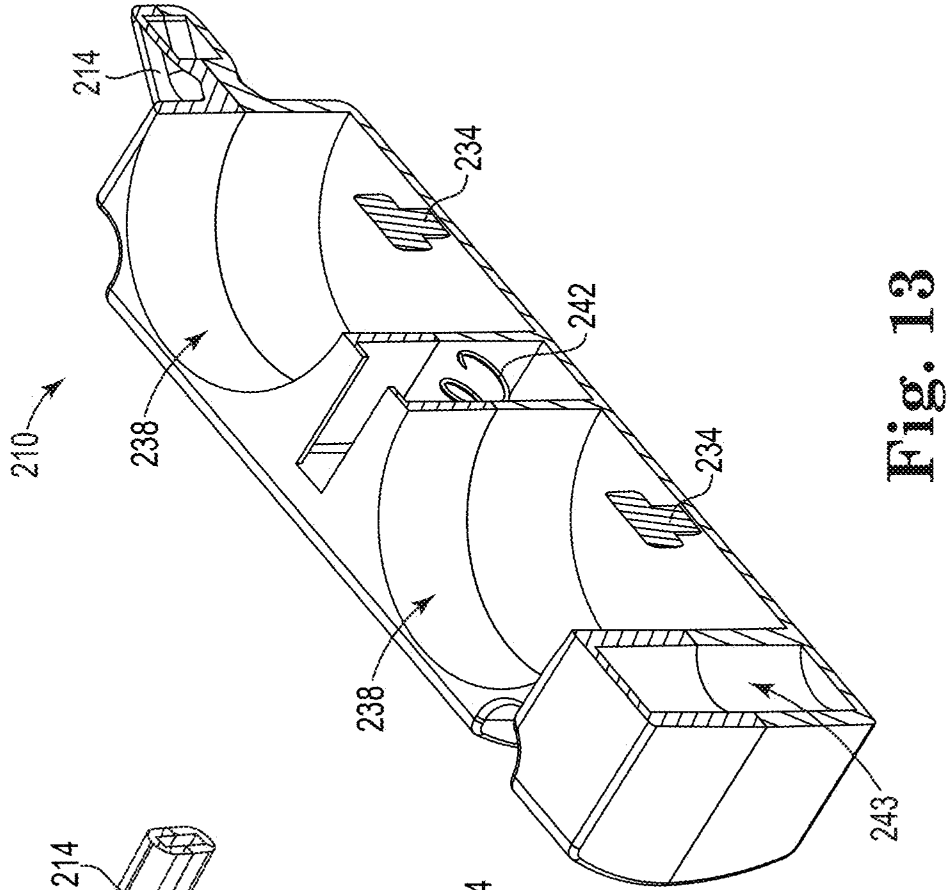
FIG. 13 is another longitudinal cross-sectional view of the adapter of FIG. 3, with an unloaded adapter, according to various embodiments.
Figure 12:
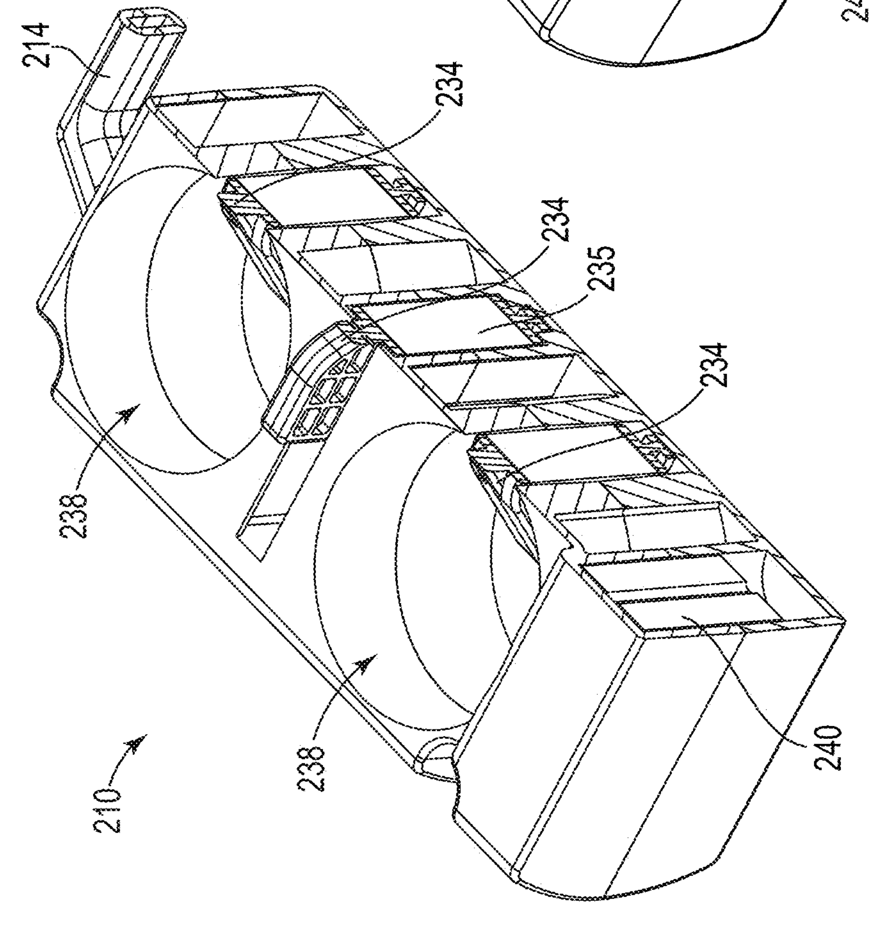
FIG. 12 is a longitudinal cross-sectional view of the adapter of FIG. 3, with an unloaded adapter, according to various embodiments.
Figure 15:
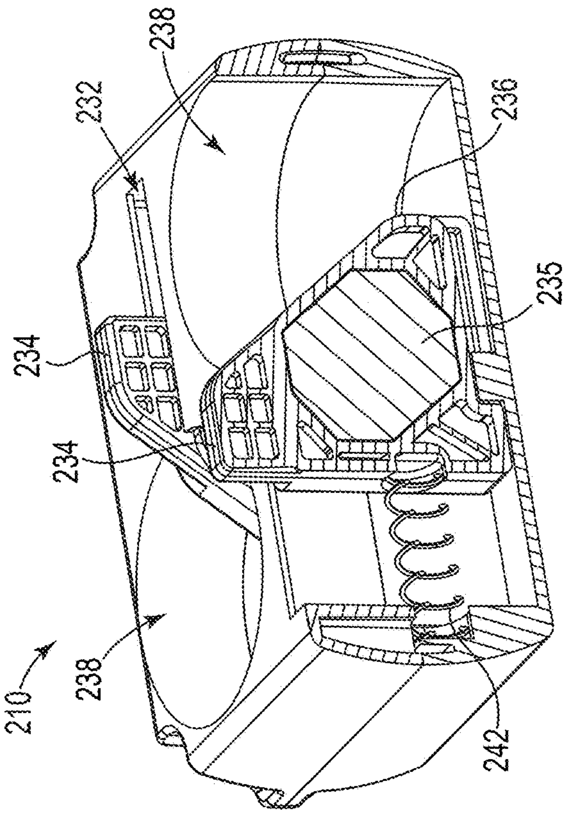
FIG. 15 is even yet another longitudinal cross-sectional view of the adapter of FIG. 3, with an unloaded adapter, according to various embodiments.
Figure 14:
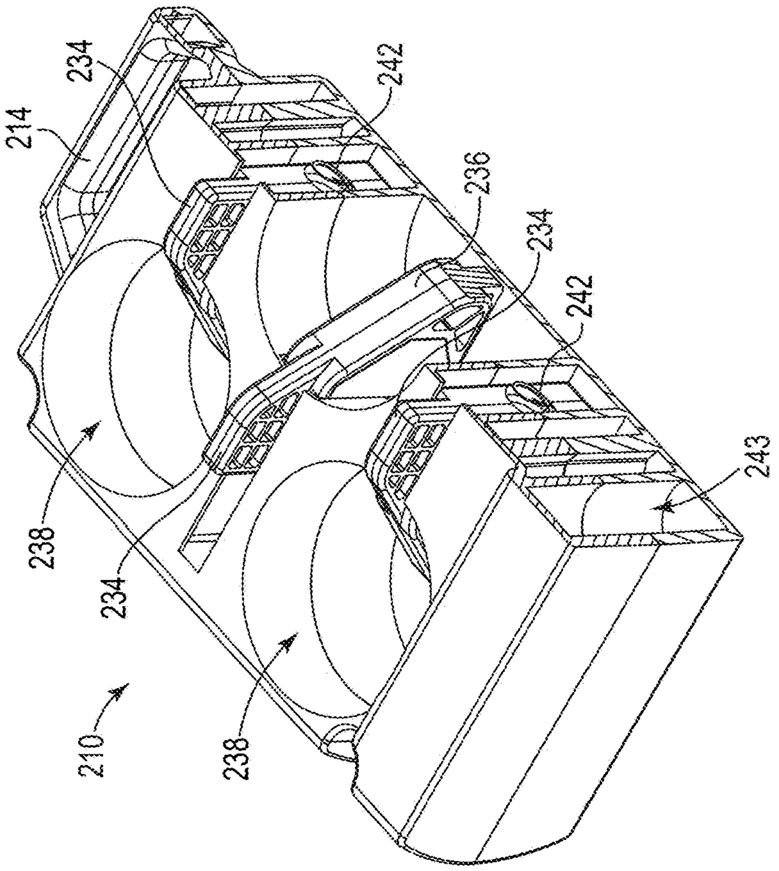
FIG. 14 is a yet another longitudinal cross-sectional view of the adapter of FIG. 3, with an unloaded adapter, according to various embodiments.
Figure 17:
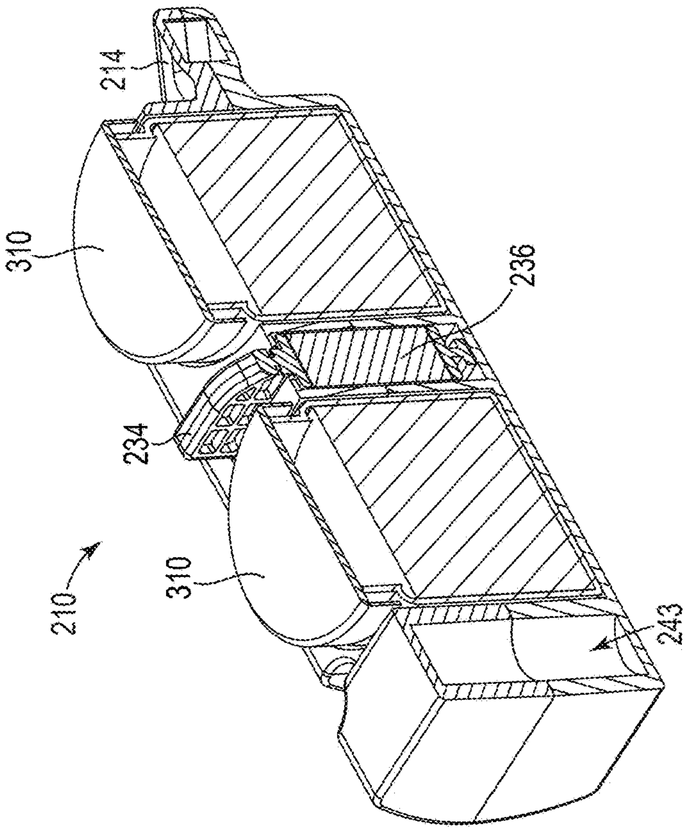
FIG. 17 is another longitudinal cross-sectional view of the adapter of FIG. 3, with a loaded adapter, according to various embodiments.
Figure 16:
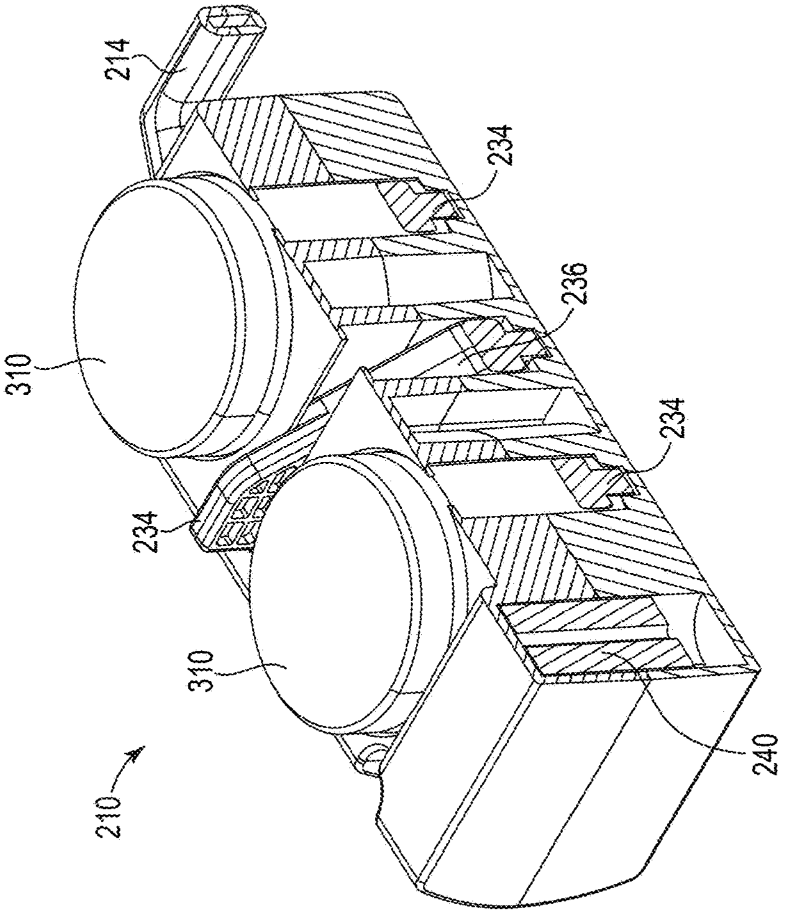
FIG. 16 is a longitudinal cross-sectional view of the adapter of FIG. 3, with a loaded adapter, according to various embodiments.

With reference to FIGS. 9-11, the adapter 210 also preferably includes at least one movable, internally and self-balancing, movable counterweight 234 configured to be displaceable when a vessel 310 is received in a respective recess 238 such that the movable counterweight 234 at least partially offsets a weight of the vessel 310 within the body 226 of the adapter 210 with respect to a vertical adapter axis 212. The movable counterweights 234 in various embodiments can be weight holders for holding a weight insert 235. The movable counterweights 234, each including the weight insert 235 as shown in FIG. 15, can each be configured to have a composition and weight that corresponds to and offsets the weight of the vessel 310 when the vessel 310 is loaded into the adapter 210 for mixing. If present, the weight insert 235 can be replaceable and/or swappable according to various configurations either by a user or a servicer. The weight insert 235 can optionally be composed of a material different than the movable counterweights 234 themselves, and in some embodiments can be formed of a denser material than the counterweights 234. For example, the weight insert 235 can be made of various metals or the like, including steel, iron, lead, etc. The weight of each counterweight 234, including the respective weight insert 235 if present, can be defined according to the size of the respective recess 238 as a proxy for a typical weight of such size and shape vessel 310.

As shown in at least FIGS. 9-11, and 14-16, in some embodiments, the movable counterweight 234 comprises a sloped ramp feature 236 such that inserting the vessel 310 into the recess 238 causes contact between a lower part of the vessel 310 and the ramp feature 236, causing a corresponding, balancing displacement of the movable counterweight 234. The ramp feature 236 of each movable counterweight 234, if present, can be angled, e.g., at 45 degrees relative to the front 224 of the body 226. Other angles greater than and less than 45 degrees are also contemplated for the ramp feature 236. The ramp feature 236 can be substantially linear in slope, curved, or any other suitable ramp shape. Optionally, at least a portion of the ramp feature 236 can have a surface with a low coefficient of friction.

The movable counterweight 234 optionally is configured to securely hold the vessel 310 in place by friction using a bias of the counterweight 234, such as by a biased coil spring 242. As shown in FIG. 6, each movable counterweight 234 is slidable within the adapter 210 along a guide slot 232 on the front 224 of the body 226. As shown in FIG. 9, each guide slot 232 can define a maximum stroke 245 length that allows movement of the counterweight 234 such that the spring 242 can freely compress and decompress based upon the loading status or manual retraction of the counterweight 234. The spring 242 can be of a size and specification (e.g., one or more spring constant, variable/progressive/linear spring rate, etc.) such that a bias is applied throughout the stroke 245 as desired for smooth and consistent operation and loading/unloading. It is understood that the adapter 210 receiving a vessel 310 may compress the spring 242 partially, and therefore move the counterweight 234 along a distance less than the maximum stroke 245 according to, e.g., a diameter of the received vessel 310.

As shown in FIG. 3, a vertical (spin) axis 212 of the adapter 210 can virtually pass through the top 216 and the bottom 217 of the adapter 210. As containers 310 are inserted into the adapter 210 and counterweights 234 are moved in a corresponding and opposite fashion and direction. The adapter 210 preferably offsets vessel 310 weight relative to the adapter axis 212 thereby substantially keeps a COG at the adapter axis 212. Each recess 238 and movable counterweight 234 combination individually balances each vessel 310 individually as each is loaded into the adapter 210. Thus, each balanced vessel 310 and counterweight 234 combination is independent of any other vessel 310 counterweight 234 combinations. In some embodiments, the adapter 210 is formed as a clamshell with the front and the back sections comprising separate pieces fastened together when assembled.

Figure 5:
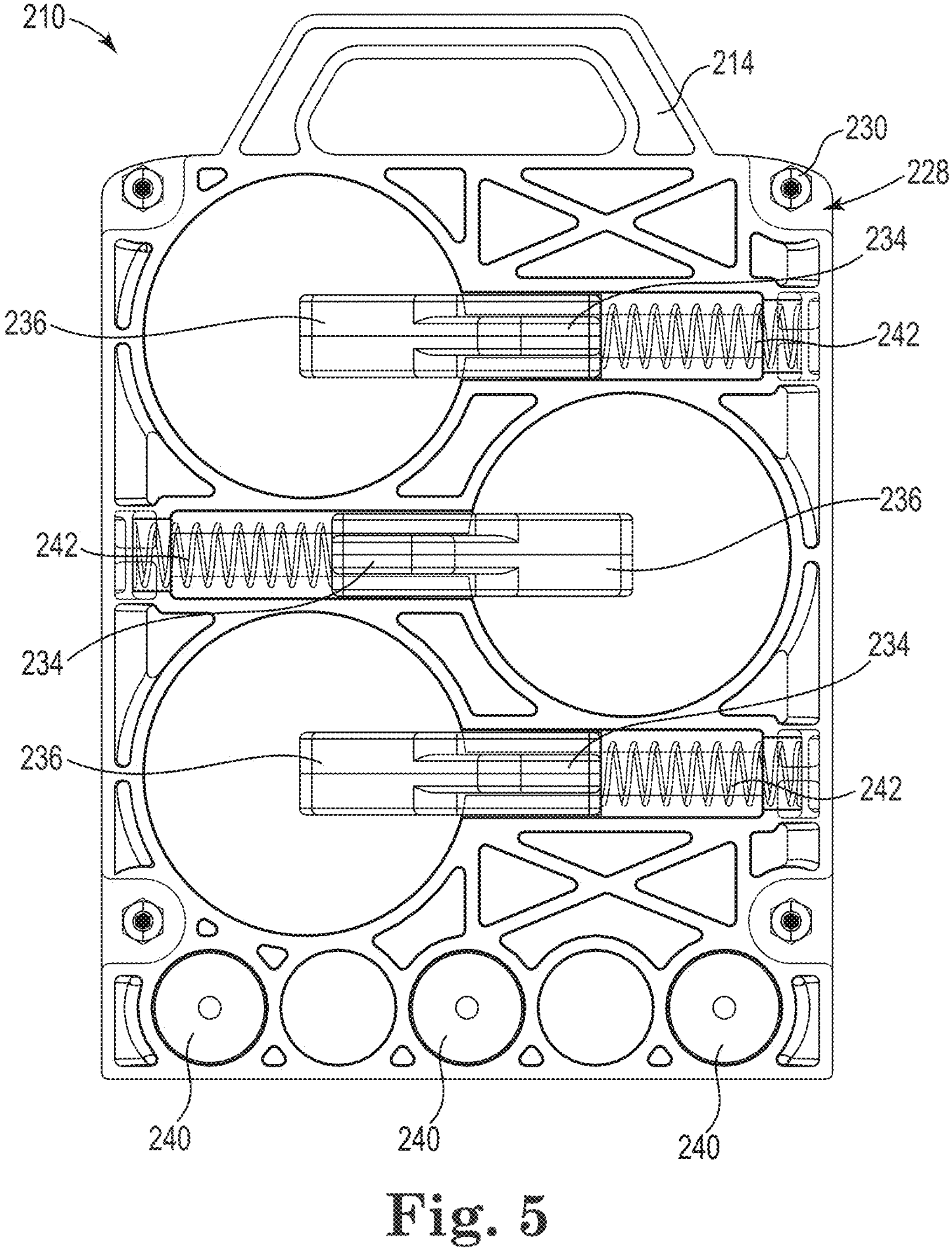
FIG. 5 is a partially transparent front plan view of the adapter of FIG. 3, according to various embodiments.
Figure 8:
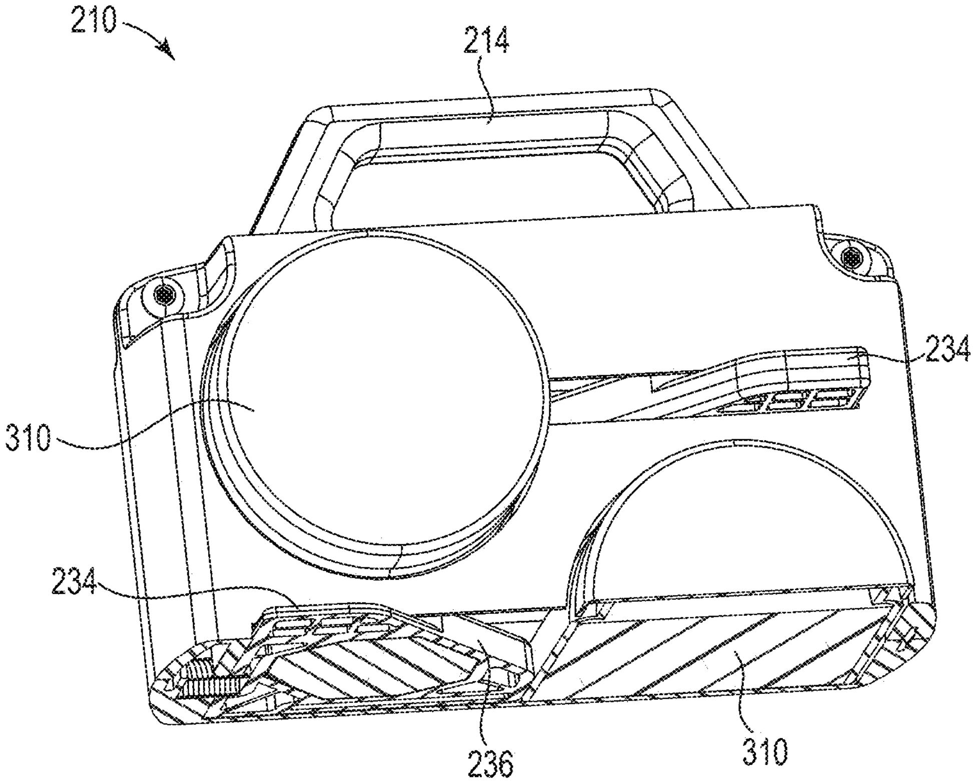
FIG. 8 is a perspective transverse cross-section view of the adapter of FIG. 3, showing multiple vessels fully loaded into the adapter, according to various embodiments.

In some embodiments, and with reference again to FIGS. 10 and 11, each movable counterweight 234 is biased by a respective biasing coil spring 242, and is able to be moved manually as the first vessel 310 is inserted into the recess 238. Any other biasing structure can be used to bias the counterweight 234. In some embodiments, and with reference in particular to FIGS. 4 and 5, the moveable counterweight 234 is biased to a fully extended resting position using the spring 242. As shown in FIG. 11, when a vessel 310 is loaded into the adapter 210, the spring 242 corresponding to the counterweight 234 is fully compressed. As shown in FIGS. 6 and 8, body 226 can be configured to receive at least a second and/or third vessel 310, such as for a total of three vessels 310. In other embodiments not shown, more than three vessels 310 can be held and balanced by a variation on adapter 210 in various configurations and arrangements.

In some embodiments, the adapter 210 when unloaded and resting is rotationally balanced such that it has COG that is substantially centered on the adapter axis 212. As discussed herein, when the adapter 210 is at least partially loaded, it preferably substantially maintains rotational balance about adapter axis 212. In some embodiments, the mixer 110 is a vortex mixer that mixes the first vessel 310 using the adapter 210 according to both the adapter axis 212 and a second, non-aligned axis. In some embodiments, the adapter axis 212 is a vortex spin axis canted relative to mixer axis 140 as shown in FIG. 2. In some preferable embodiments, the mixer axis 140 also represents an overall balanced COG of the mixer 110, adapter 210, and any loaded vessels 310.

Sliding ramps 236 on movable counterweights 234 allow for self-balancing of the adapter 210 as a center plane 412 progressively moves away to become offset planes as each sample container or vessel 310 is loaded or inserted into the adapter 210. In some embodiments, the displacement of each movable counterweight 234 provides a rotation offset such that a COG of the adapter 210 is substantially aligned with the adapter axis 212 when the first vessel 310 is received in the recess 238. Pushing a vessel 310 down on the ramp feature 236 of the counterweight 234 causes the counterweight to slide over, e.g., into guide slot 232. This sliding and moving of the counterweight 234 offsets the weight of the full vessel 310 being pushed in, keeping the overall COG of the adapter 210 centered. When a vessel 310 is removed, the corresponding spring 242 repositions the counterweight 234 so that it is re-centered on the adapter 210. According to the present disclosure, the COG of the adapter 210 is therefore maintained substantially centrally to the adapter 210 during all stages of loading, unloading, mixing, and so forth.

Figure 20:
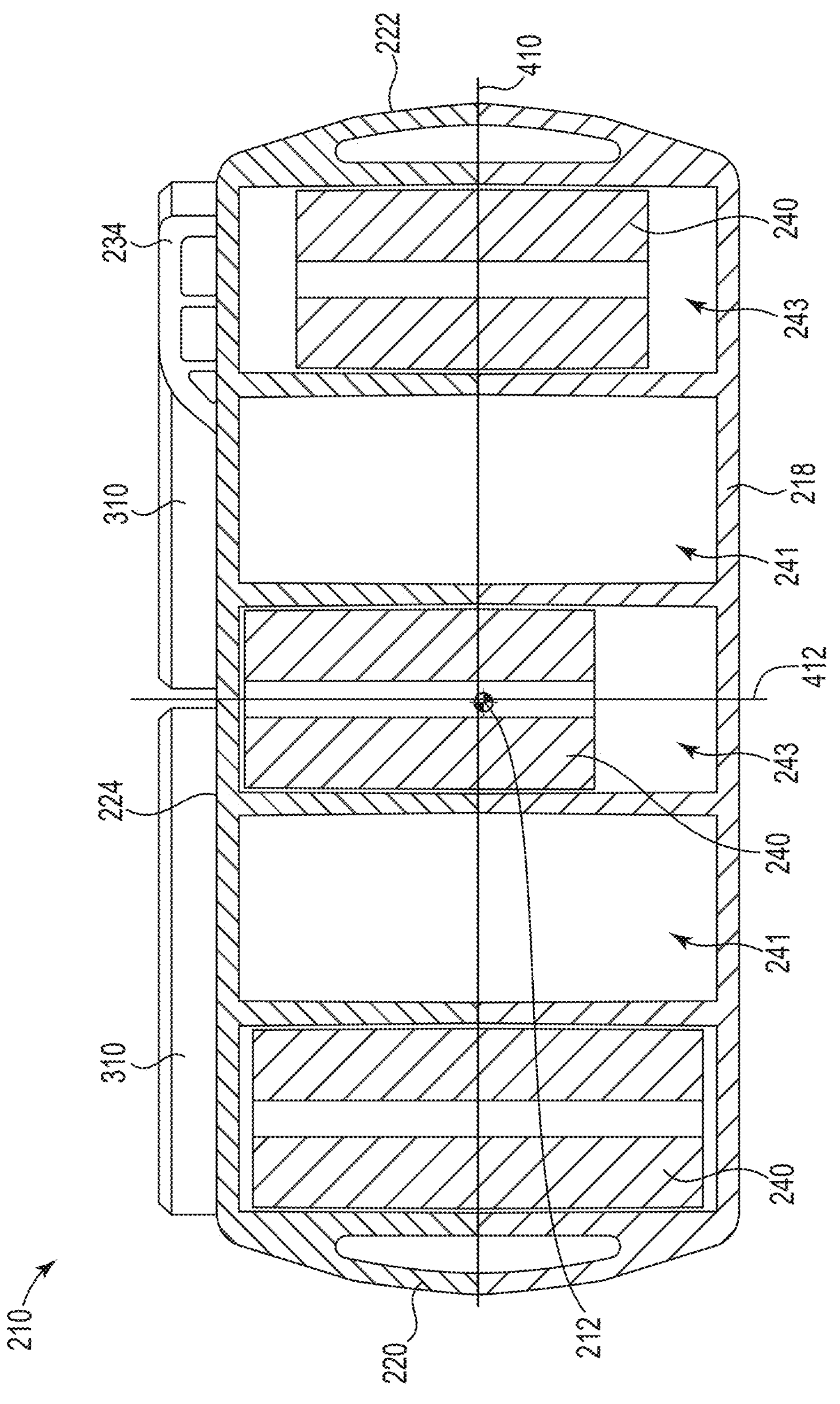
FIG. 20 is another transverse cross-sectional view of the adapter as shown in FIG. 18, showing a center of gravity and planes, according to various embodiments.

As shown in FIGS. 10, 11, and 20, transverse plane 410 is a plane that is generally coplanar with the front 224 and back 218 of the body 226 of the adapter 210. As described herein, the transverse plane 410 is stable before, during, and after loading vessels 310 into adapter as described herein. One or more vertical planes 412 are preferably also collectively centered before, during, and after loading the vessels 310 into the adapter 210. As shown in FIG. 11, a vessel 310 and counterweight 234 combination when loaded have split vertical planes 412A and 412B corresponding to a center plane. Each of the split vertical planes 412A/B as shown can correspond to a COG of the counterweight 234 or the vessel 310 when loaded, respectively. The average of the split vertical planes 412A/B corresponding to various weighted bodies is preferably equivalent to the single vertical plane 412 as shown in FIG. 10. Loading any number of vessels 310 into adapter therefore preferably causes the one or more vertical planes 412A/B to sum to a central vertical plane 412 as shown in FIG. 20.

The adapter axis 212 is preferably a vertical spin axis in a frame of reference of the adapter 210, as shown in FIGS. 3 and 20. The adapter axis 212 is defined as the intersection of two planes, a vertical plane 412 and a transverse plane 410 that each bisect the adapter 210. Three weights 240, as shown in FIG. 3, are positioned to align the COG of the adapter 210 at the adapter axis 212 and to position the COG of the adapter 210 at or near the mixer axis 140 for mixing. A COG as used herein can include one or more COG components corresponding to one or more axes, such as aligned in any orientation in three-dimensional space.

A COG of adapter 210 assembly is shown in FIG. 20, which rotates on adapter axis 212. As shown in particular in FIGS. 4, 12, 18, 19, and 20, in some embodiments, the one or more weights 240 are located proximate the bottom 217 of the body 226. The weights 240 can be provided, sized, weighted, positioned, and configured such that a COG of the adapter 210 is positioned (e.g., lowered) along the mixer axis 140. The weights 240 can optionally give inertial stability and/or a perceived feeling of substantiality to a user handling the adapter 210 as compared to example of the adapter 210 without weights 240. The three weights 240 proximate the bottom of the adapter 210 also preferably serve to lower the COG of the adapter 210, which brings the overall loaded, unloaded, or partially loaded adapter 210 COG closer to being aligned with the mixer axis 140 of FIG. 2. Preferably, the COG of the adapter 210 is therefore aligned with both of axes 212 and 140 for mixing.

Figure 19:
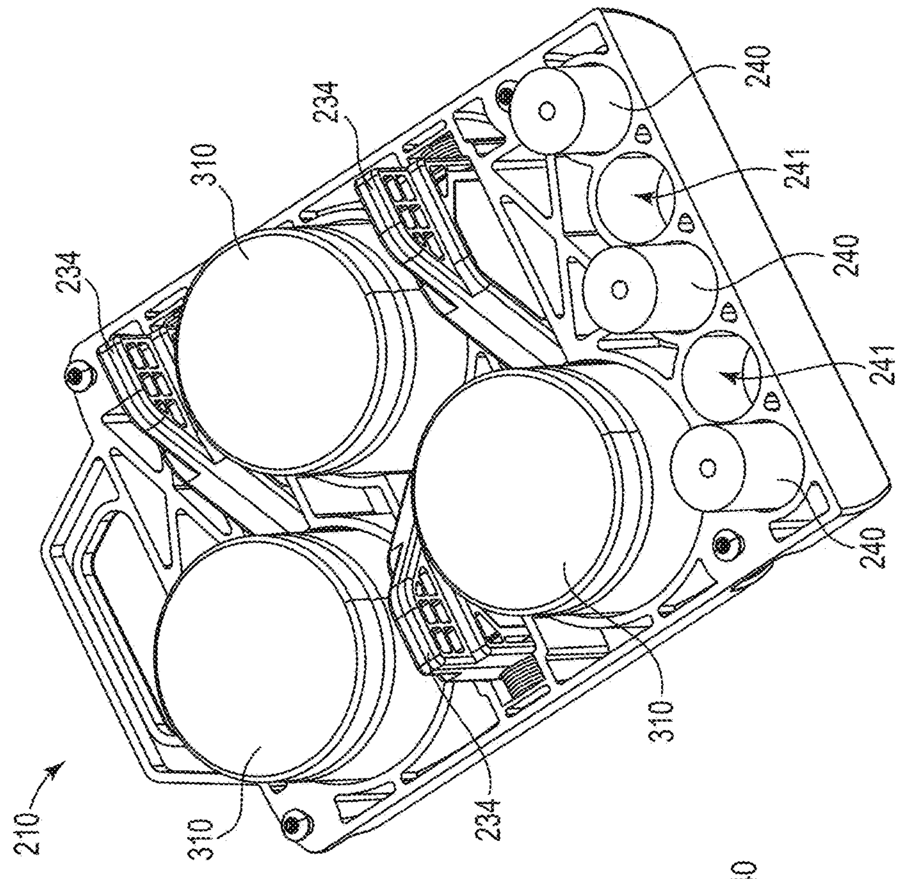
FIG. 19 is a perspective view of the adapter of FIG. 3, with a front cover removed to show various components, according to various embodiments.
Figure 18:
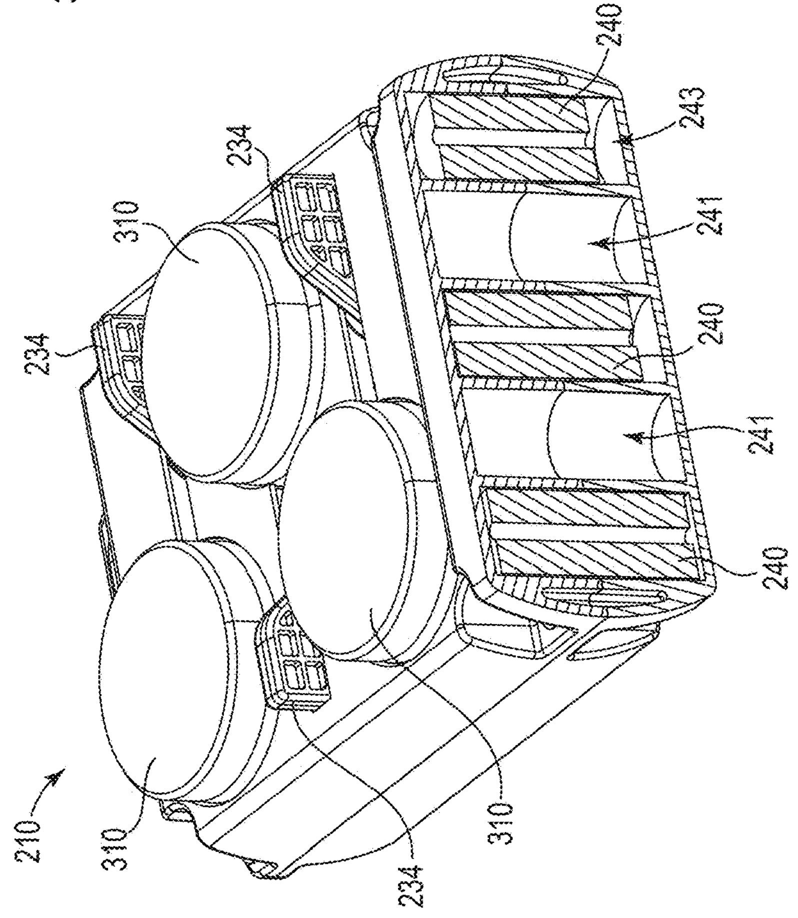
FIG. 18 is a transverse cross-sectional view of optional ballast weights within the adapter of FIG. 3, according to various embodiments.
Figure 21:
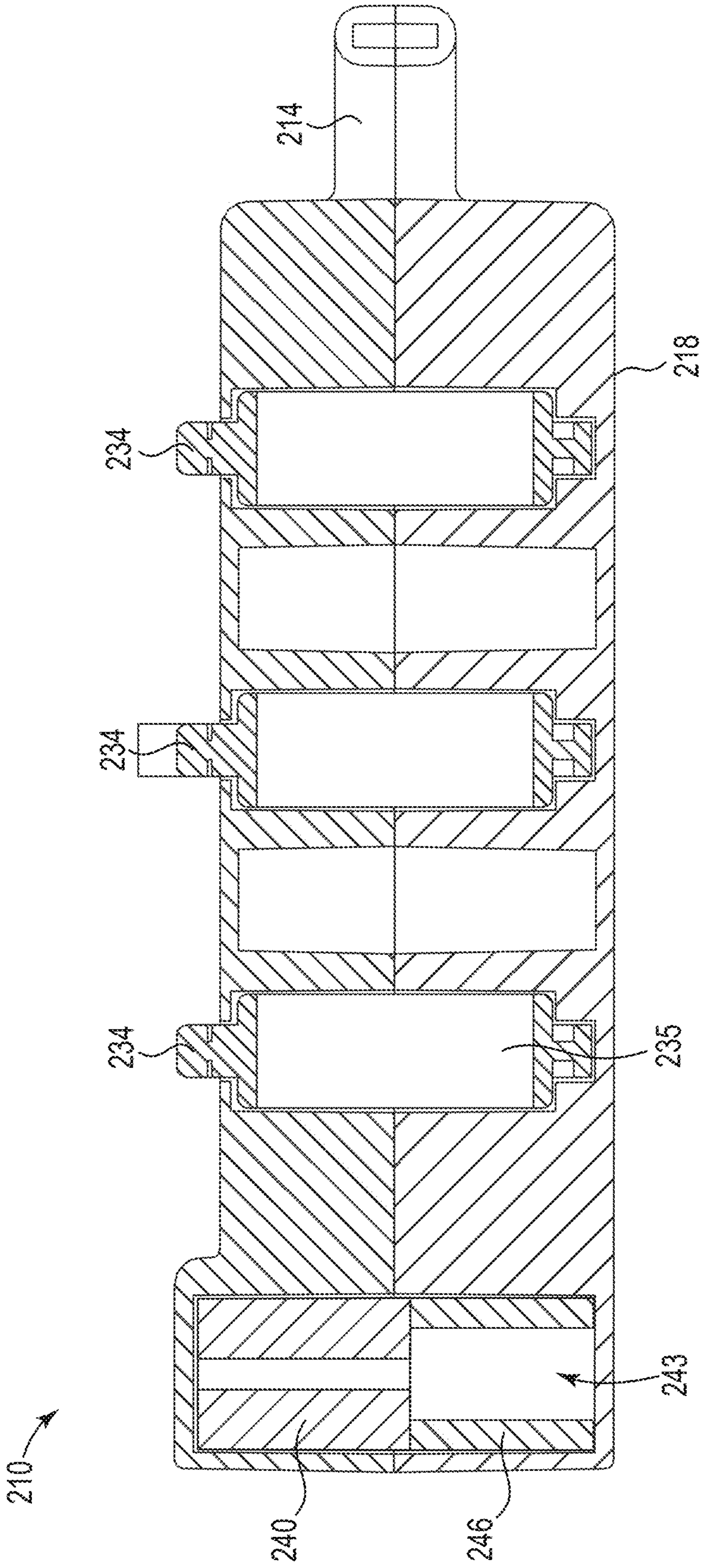
FIG. 21 shows a weight-positioning spacer within the adapter as shown in FIG. 18, according to various embodiments.

Keeping the two COG components close to center at the two respective axes 140 and 212 can reduce the vibration in the mixer 110 during mixing operation. It is to be understood that any weights 240 are optional and the adapter 210 as described herein is functional even without the provision of one or more weights 240. As shown in FIGS. 18-20, the weights 240 are receivable within pockets 243 within adapter 210. Also shown are one or more optionally empty pockets 241, which are shown without weights 240 inserted therein. The weights 240 can be of any suitable size and can be in any suitable location, including but not limited to pockets 243, and/or 241. In various embodiments, a weight 240 inside a pocket 243 can leave at least some open space. For example, and as shown in FIG. 21, one or more weight spacers 246 (e.g., comprising plastic) can be positioned within pockets 243 for holding weights 240 in position. Optionally, each spacer 246, if employed, can be sized and positioned such that the COG is optimally aligned with axes 140 and/or 212. Various stepped features (not shown) can be added into the adapter 210 body pockets, so in some embodiments no spacers 246 are used to hold the weight(s) 240, e.g., in optimal balancing position.

Figure 23:
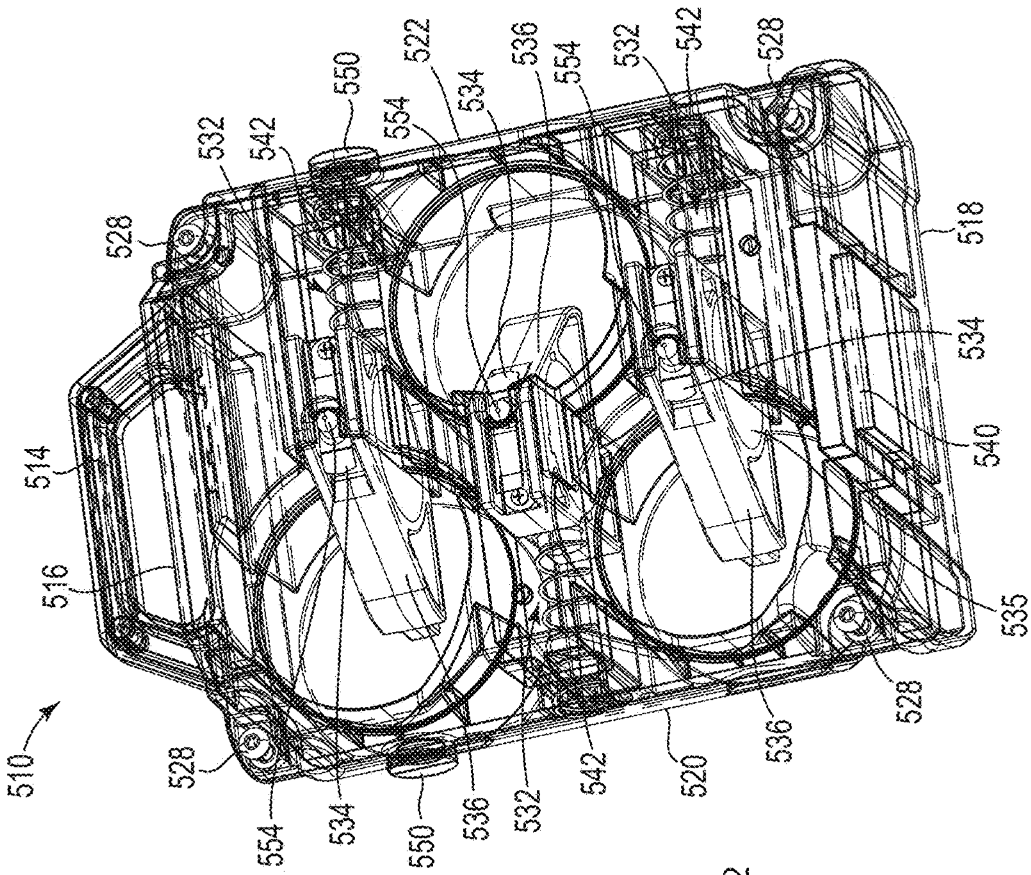
FIG. 23 shows a partially transparent perspective view of the alternative adapter of FIG. 22, according to various embodiments.
Figure 22:
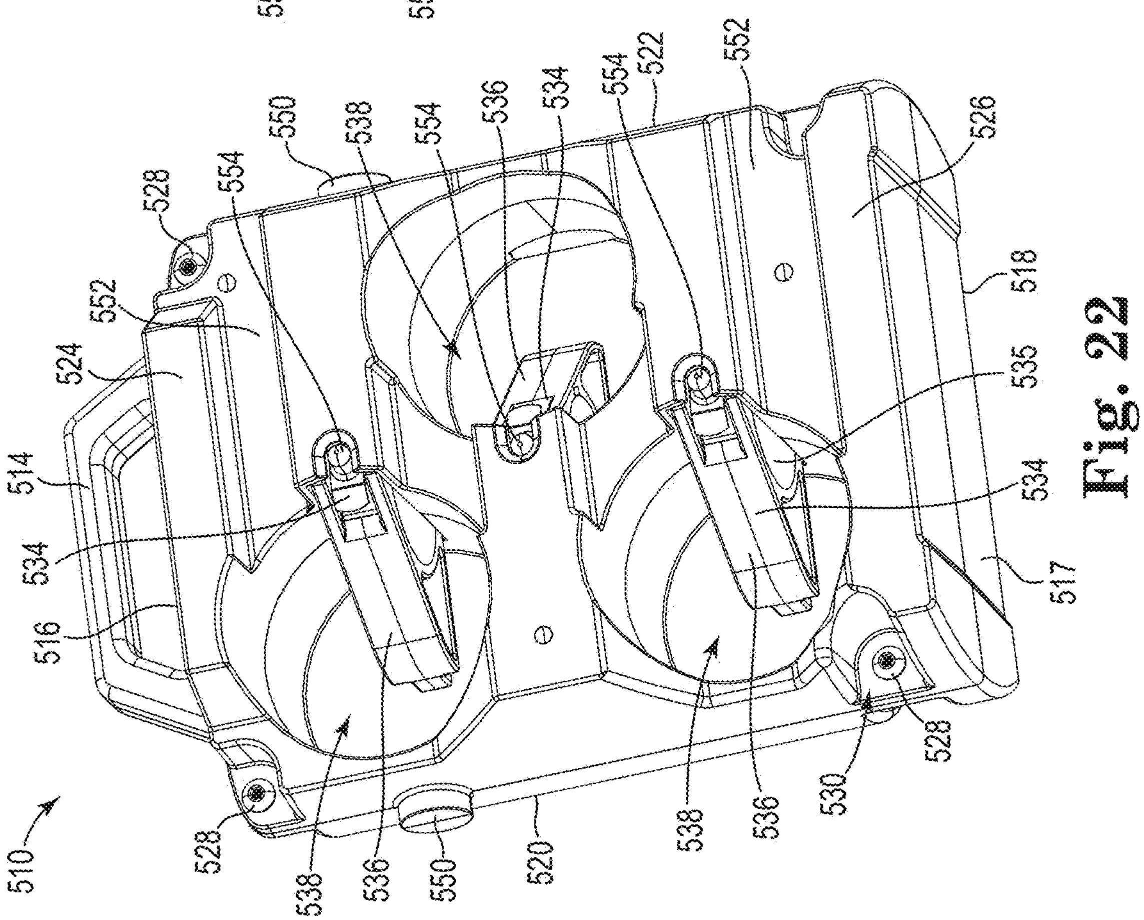
FIG. 22 shows a perspective view of an embodiment of an alternative adapter, according to various embodiments

With reference now to FIGS. 22 and 23, an alternative embodiment 510 of an adapter similar to adapter 210 described above is shown. Descriptions of certain parts of adapter 510 are omitted for brevity, although it is understood that any features described with reference to adapter 210 can be implemented with alternative adapter 510, which is described in greater detail below.

With reference now to FIGS. 22 and 23, the alternative adapter 510 is shown in detail. The adapter 510, which can be similar to adapter 210, is preferably a self-balancing adapter that includes internal movable, self-balancing features that make the adapter versatile and simple to use. The adapter 510, as shown, has a body 526 that includes a front 524 and a back 518, left 520 and right 522 edges, a top 516 and a bottom 517. As shown in FIG. 22, the body 526 preferably has one or more groves 552 on a surface thereof. Also as shown, the body 526 of adapter 510 optionally includes one or more transverse projections 550 therefrom (optionally configured to fit into a respective bail tab 136 as shown in FIG. 1, such as to hold the adapter 510 in place relative to a receptable such as 112, above.). In various embodiments, the adapter 510 is formed as a clamshell with the front 524 and the back 518 comprising separate pieces fastened together. The front 524 and the back 518 can be fastened together, e.g., using fasteners 528 in corner fastener recesses 530. In some embodiments, the body 526 further comprises a handle 514 extending from the top 216 of the body 226. The handle 514 is preferably graspable by a user such that the adapter 510 can be inserted and/or removed from a receptacle (e.g., receptable 112 of FIGS. 1 and 2, above) before or after mixing. The front 524 of the adapter 510 preferably has at least a (e.g., first) recess 538 configured to receive and hold a first container, vessel, or can (e.g., vessel 310, see FIG. 6) substantially within the body 526 of the adapter 510. For example, if a vessel 310 is intended to be loaded into the recess 538, and the vessel has a generally cylindrical shape, the recess 538 can have a corresponding and slightly larger diameter bore and cylindrical shape configured to slidably receive and closely hold and support a loaded vessel 310. Other embodiments can provide for a generally rectangular recess 538 for a corresponding rectangular vessel 310 (not shown). Other shapes of the recess 538 and vessel 310 are also contemplated herein.

Still with reference to FIGS. 22 and 23, the adapter 510 also preferably includes at least one movable balancing counterweight 534, shown with a protrusion 554 thereon, configured to be displaceable when a vessel 310 is received in a respective recess 538, as in adapter 210. Protrusions 554, if present, can benefit balance of the adapter 510 during mixing and can be snap-action, friction-based, or other releasably holding parts configured to at least partially hold counterweights 534 (in conjunction with a complementary mechanical part of adapter body 526) in place particularly when a recess 538 is not presently filled with a vessel 310. The protrusions 554 therefore optionally hold the counterweight 534 in a stable position during mixing and/or spinning. Insertion of a vessel 310 preferably causes protrusions 554 to be displaced from a stable held position shown as a corresponding spring 542 is increasingly compressed.

As shown, the movable counterweight 534 comprises a sloped ramp feature 536 such that inserting the vessel 310 into the recess 538 causes contact between a lower part of the vessel 310 and the ramp feature 536, causing a corresponding, balancing displacement of the movable counterweight 534. The ramp feature 536 of each movable counterweight, if present, can be angled, e.g., at 45 degrees relative to the front 524 of the body 526. Other angles greater than and less than 45 degrees are also contemplated for the ramp feature 536. The ramp feature 536 can be substantially linear in slope, curved, or any other suitable ramp shape. Counterweights 534 have optionally round weight inserts 535 shown therein. Any other shape weight insert 535 is also contemplated here.

The movable counterweight 534 optionally is configured to securely hold the vessel 310 in place by friction using a bias of the counterweight 534, such as by the biased coil spring 542. As shown, each movable counterweight 534 is slidable within the adapter 510 along an internal guide slot 532 not visible from the front 524 of the body 526. As shown, adapter 510 has a generally planar weight 540, which preferably provides similar characteristics to weight(s) 240, described above. In various embodiments, the planar weight 540 can be utilized to optimize and/or reduce the adapter 510 size and shape according to various dimensions and requirements. Other variations on weights and placements thereof are also contemplated.

According to an example of the present disclosure, a method of mixing a sample paint vessel is disclosed. According to the example, a self-balancing adapter for use with a mixer is provided, the adapter comprising a body configured to interface with the mixer as a unit. According to the example, the body has a front and a back, left and right edges, a top and a bottom, and a vertical adapter axis passing through the top and the bottom. According to the example, the front has at least a first recess configured to receive and hold a first vessel substantially within the body; and at least one movable counterweight configured to be displaced when the first vessel is received in the first recess such that the movable weight at least partially offsets a weight of the first vessel within the body with respect to the vertical adapter axis. According to the example, the method also includes receiving a vessel within the adapter, inserting the adapter into a mixer, and optionally performing a mixing operation of the adapter.

The present invention has now been described with reference to several embodiments thereof. The entire disclosure of any patent or patent application identified herein is hereby incorporated by reference. The detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

The invention claimed is:

1. A self-balancing adapter for use with a mixer, comprising:
   a body configured to interface with the mixer as a unit, the body having:
      a front and a back,
      left and right edges,
      a top and a bottom, and
      a vertical adapter axis passing through the top and the bottom;
   the front having at least a first recess configured to receive and hold a first vessel substantially within the body; and
   at least one movable counterweight configured to be displaced when the first vessel is received in the first recess such that the movable weight at least partially offsets a weight of the first vessel within the body with respect to the vertical adapter axis.

2. The adapter of claim 1, wherein the movable counterweight comprises a ramp feature such that inserting the first vessel into the first recess causes the displacement of the movable counterweight.

3. The adapter of claim 1, wherein the movable counterweight is moved manually as the first vessel is inserted into the first recess.

4. The adapter of claim 1, wherein the moveable counterweight is biased to a resting position.

5. The adapter of claim 4, wherein the movable counterweight is biased using a spring.

6. The adapter of claim 1, wherein the body is configured to receive at least a second vessel.

7. The adapter of claim 1, wherein the body further comprises a handle attached at the top of the body.

8. The adapter of claim 1, wherein the body is shaped and sized to fit in a space within the mixer configured to receive a vessel larger than the first vessel.

9. The adapter of claim 8, wherein the first vessel is a sample paint container and the mixer is configured to receive a one-U.S. gallon paint container.

10. The adapter of claim 1, wherein the bottom of the body comprises an anti-skid feature to reduce movement of the body within the mixer during mixing.

11. The adapter of claim 1, wherein the displacement of the movable counterweight provides a rotation offset such that a center of gravity of the adapter is substantially aligned with the vertical adapter axis when the first vessel is received in the first recess.

12. The adapter of claim 1, wherein the body further comprises at least a weight located proximate the bottom of the body such that a center of gravity of the adapter is lowered along the vertical adapter axis.

13. The adapter of claim 1, wherein the adapter when unloaded and resting is rotationally balanced such that it has a center of gravity that is substantially centered on the vertical adapter axis.

14. The adapter of claim 1, wherein the vertical axis is an adapter spin axis.

15. The adapter of claim 1, wherein the mixer is a vortex mixer.

16. The adapter of claim 15, wherein the vortex mixer mixes the first vessel according to the vertical adapter axis and a second, non-aligned mixer axis.

17. The adapter of claim 16, wherein the adapter has a center of gravity that is substantially centered on the vertical adapter axis and the second, non-aligned mixer axis.

18. The adapter of claim 1, wherein the adapter is formed as a clamshell with the front and the back comprising separate pieces fastened together when assembled.

19. A mixer, comprising:
   a receptacle supported by a carrier yoke, wherein the yoke is rotatably supported by a frame;
   a motor supported by the frame, wherein the motor is configured to rotate at least the yoke supporting the receptacle; and a self-balancing adapter configured to be received within the receptacle, the adapter comprising:

a body configured to interface with the mixer as a unit, the body having:

a front and a back, left and right edges, a top and a bottom, and a vertical adapter axis passing through the top and the bottom;

the front having at least a first recess configured to receive and hold a first vessel substantially within the body; and at least one movable counterweight configured to be displaced when the first vessel is received in the first recess such that the movable weight at least partially offsets a weight of the first vessel within the body with respect to the vertical adapter axis.

20. A method of adapting a mixer for use with different sized vessels, comprising:

providing a self-balancing adapter for use with a mixer, the adapter comprising:

a body configured to interface with the mixer as a unit, the body having:

a front and a back, left and right edges, a top and a bottom, and a vertical adapter axis passing through the top and the bottom;

the front having at least a first recess configured to receive and hold a first vessel substantially within the body; and at least one movable counterweight configured to be displaced when the first vessel is received in the first recess such that the movable weight at least partially offsets a weight of the first vessel within the body with respect to the vertical adapter axis;

receiving a vessel within the adapter; and inserting the adapter into the mixer.

* * * * *